Patented June 29, 1954

2,682,533

UNITED STATES PATENT OFFICE 2,682,533

METHOD OF DEBITTERIZATION OF CASCARA SAGRADA

Edward D. Davy, Phoenix, Ariz.

No Drawing. Application May 19, 1952,
Serial No. 288,755

3 Claims. (Cl. 260—210)

This invention relates to the debitterization of the drug from *Rhamnus purshiana* (cascara sagrada), or other species of the genus Rhamnus.

An object of the invention is to debitterize the products extracted from *Rhamnus purshiana* or other species of the genus Rhamnus.

Another object of the invention is to provide a simple and efficient process for debitterizing such drugs, and particularly the products of cascara sagrada, and to retain the laxative properties thereof.

A further object of the invention is to provide a debitterized extract of cascara sagrada in which its laxative activity is not substantially impaired and to provide an extract which does not have the effect of causing unpleasant side effects when used physiologically.

According to my process it is possible to completely debitterize the products of cascara sagrada without substantially impairing their laxative activity.

The above and other objects of the invention will be readily apparent to those skilled in the art from the description herein.

In carrying out my process it will be described in connection with cascara sagrada, which is the most important one of the species above referred to. Dry cascara bark, which has been aged for at least two years, is ground to a coarse powder, treated with water, preferably hot or boiling water, in the ratio of about one part bark and about five parts of the water, and macerated in a suitable receptacle, such as a percolator. When maceration is complete the percolation is started and continued with hot water until the drug is essentially exhausted. The percolate is then reduced in volume by evaporation, preferably in vacua, or in any other suitable manner, until it has a thick syrupy consistency while hot. This extractive is then transferred to a power driven dough mixer, or other suitable mixing device, provided with a tightly fitting cover and allowed to cool.

The bitter elements of the extractive are then removed by fractionation with a selective solvent as follows: Acetone is used as a selective solvent and sufficient water is used with it to keep the extractive mobile or workable; water is kept at a minimum and to this end alcohol is used in equal proportions with the water. It is desirable to keep the water at a minimum to avoid undue loss of the active material. The addition of alcohol makes it unnecessary to increase water to maintain workability of the extractive. Whereas it is possible to use a mix of acetone and water, the use of a portion of alcohol is preferred because the use of water alone with the solvent results in a greater loss of active material. The solvent wash is preferably composed of acetone 80 parts, alcohol 10 parts, and water 10 parts, by volume. The bitter elements, soluble in this mixture, are removed from the extractive by a series of five or six washes. Since the extractive contains some water at the time of the first wash, no water need be added to the acetone and alcohol solvent; the first wash, then, is composed of acetone 90 parts and alcohol 10 parts. All subsequent washes are composed of a solvent as above first stated.

The acetone soluble fractions from the several washes are combined and the acetone and alcohol recovered by distillation. The residue from this distillation contains the bitter elements of the extractive.

The material insoluble in the acetone-alcohol-water mixture contains the major part of the bitterless active principles of the extractive, and is the product herein concerned as one of the major objects of this invention. Residual acetone may be removed from it by heat, with vacuum if desired, and it may then be rendered fluid in a hydro-alcoholic menstrum, and sweetened with sugar or saccharin and flavored with aromatics.

Since considerable sludge is formed when the debitterized extractive is dissolved in the hydro-alcoholic menstrum, as with other fluid extracts, the product should be aged and then filtered to produce a pharmaceutically elegant preparation. Since the bitterness is removed, the amounts of sweetening and aromatics may be kept to a low level.

This method of debitterization lends itself admirably to the preparation of an aromatic cascara of high potency.

In view of the above I make the following claims:

1. The process of making a debitterized extract of cascara sagrada, which comprises preparing a liquid water extractive of the bark; concentrating this extractive, by evaporation of the water therein, to a thick syrupy consistency when hot and removing the bitter elements from said concentrated extractive by dissolving them in acetone with only sufficient water to maintain said extractive in a mobile condition so that it will be amenable to the action of said solvent.

2. The process of making a debitterized extract of cascara sagrada, which comprises preparing a liquid water extractive of the bark; concentrating this extractive, by evaporation of the water therein, to a thick syrupy consistency when hot and removing the bitter elements from said concentrated extractive with a series of washes composed of approximately acetone 80 parts, alcohol 10 parts, and water 10 parts, by volume.

3. The process of making a debitterized extract of cascara sagrada, which comprises preparing a liquid water extractive of the bark; concentrating this extractive, by evaporation of the water therein, to a thick syrupy consistency when hot and removing the bitter elements from said concentrated extractive with a series of washes composed of acetone 80 parts, alcohol 10 parts and water sufficient only to maintain said concentrate sufficiently mobile to give access to said acetone and alcohol to all parts of said concentrate.

References Cited in the file of this patent

UNITED STATES PATENTS

| Number | Name | Date |
| --- | --- | --- |
| 1,167,230 | Tambach | Jan. 4, 1916 |
| 2,552,896 | Lee et al. | May 15, 1951 |